Oct. 5, 1954
J. B. ATWOOD
2,691,097
SQUELCH CIRCUIT
Filed May 16, 1951
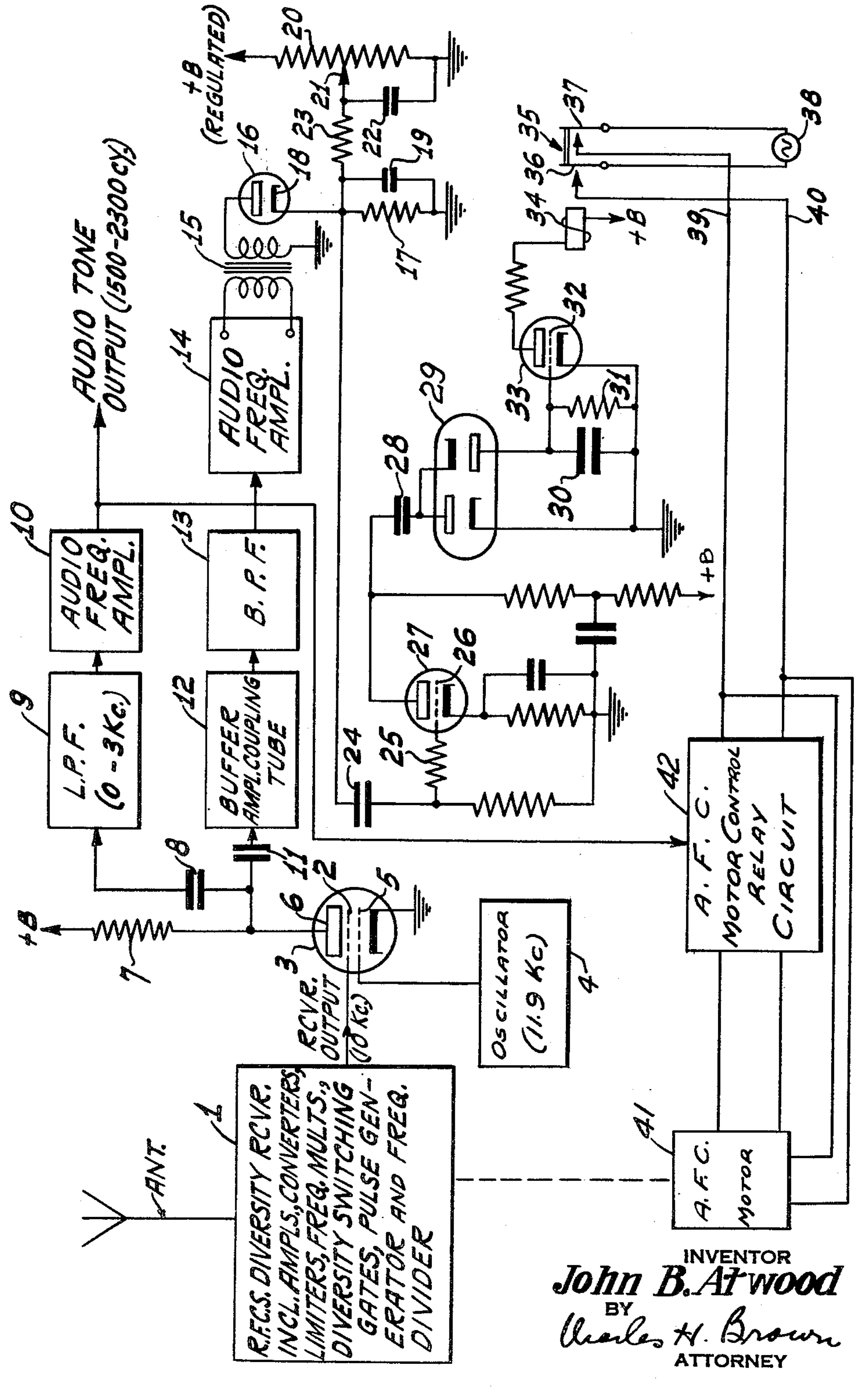
INVENTOR
John B. Atwood
BY
Charles H. Brown
ATTORNEY Patented Oct. 5, 1954 2,691,097

UNITED STATES PATENT OFFICE 2,691,097

SQUELCH CIRCUIT

John B. Atwood, Riverhead, N. Y., assignor to Radio Corporation of America, a corporation of Delaware Application May 16, 1951, Serial No. 226,711

4 Claims. (Cl. 250—20)

This invention relates to a squelch circuit, and more particularly to a circuit for squelching or rendering inoperative an automatic frequency control (AFC) circuit in a receiver, in response to the absence of a signal in such receiver. Although the invention will be described in connection with a radio frequency carrier shift (RFCS) radiophoto receiver, it is to be understood that it may have utility in other types of receivers.

The RFCS radiophoto receiver described in my copending application, Ser. No. 118,618, filed September 29, 1949, now Patent #2,624,834, dated January 6, 1953, has been used extensively under various conditions for which it was not designed. In one particular application of the receiver, one sideband of a subcarrier frequency modulated double sideband transmitter has been utilized as an RFCS signal for such receiver; in another application thereof, one sideband of a single sideband transmitter has been utilized for the same purpose. In these latter applications, a difficulty arose when the radiophoto transmitting machine was stopped and no tone was transmitted. The RFCS receiver visualized this stoppage of tone from the remote transmitter as a loss of signal; as a result, the tuning of the receiver wandered around in a random manner in response to the actuation of the AFC circuit of the receiver by the receiver noise. This random variation of the receiver tuning is undesirable, since when the radiophoto transmitting machine is again started the receiver may then be so far out of proper tune as to make it exceedingly difficult, if not impossible, for the AFC to correct the tuning.

According to this invention, the difficulty above mentioned is overcome by disabling the AFC circuit of the receiver in response to the absence or loss of signal in the receiver, and by enabling such circuit when the signal returns. If a highly stable receiver is used, the amount of frequency drift then occurring between pictures is quite small and is very easily corrected by the AFC at the start of the next picture, when the signal again appears in the receiver.

An object of this invention is to devise a novel AFC squelch circuit which is relatively simple yet very effective in operation.

The foregoing and other objects of the invention will be best understood from the following description of an exemplification thereof, reference being had to the accompanying drawing, wherein the single figure is a schematic circuit diagram of an arrangement according to this invention.

Briefly stated, in accordance with a preferred embodiment of the invention, a filter which passes noise frequencies, produced by the receiver in the absence of signal and in a frequency band outside of the signal band, is coupled to a converter tube in the receiver. A biased diode is coupled to this filter's output and feeds a step countercharging circuit or integrating circuit which provides the control bias on a tube which energizes a relay the contacts of which are connected between the AFC motor and the source of power therefor. In the absence of signal, noise goes through the filter to cause release of the relay and opening of the AFC motor circuit; in the presence of signal, no appreciable amplitude of noise passes through the filter so that the relay is energized to close the energization circuit for the AFC motor.

Referring to the drawing in more detail, there is shown an RFCS receiver 1 which supplies output to one grid 2 of a converter tube 3. Radio receiver 1 receives incoming signal waves from a suitable antenna ANT. The output from receiver 1 may be centered at 10 kilocycles, for example, the frequency shifting in one direction or the other about this frequency value in accordance with the signals being received, which may be radiophoto or facsimile signals, for example. Since the frequency of this receiver output signal shifts, such output signal may be considered as a frequency modulated signal. The receiver 1, which produces the low intermediate frequency carrier wave output centered at 10 kilocycles, may if desired be of the so-called diversity type and may include the elements listed by legend in block 1; this receiver is preferably arranged as described in my copending application above referred to.

An oscillator 4, having a frequency of 11.9 kilocycles, for example, feeds output energy to another grid 5 of tube 3. In vacuum tube converter 3, mixing of the frequencies applied to grids 2 and 5 takes place. The various frequencies appearing at anode 6 of tube 3 are fed by means of load resistor 7 and a coupling capacitor 8 to the input of a low pass filter 9 which may have an upper cut-off frequency of 3 kilocycles. For facsimile or radiophoto signals having a 10 kc. center frequency there may be a maximum frequency shift of 800 cycles in the received signal (±400 cycles each side of the center frequency) so that the frequency of the signal applied to grid 2 varies from 9600 cycles to 10,400 cycles in accordance with the intelligence. By means of the filter 9, the difference frequency appearing at anode 6 is selected or passed; this means that the output of filter 9 varies from 1500 cycles to 2300 cycles, and is in the audio range. The other frequencies, such as the sum frequency, the 11.9-kc. oscillator frequency and the 10-kc. receiver output frequency, are eliminated by the action of filter 9. The audio tone output of filter 9 is amplified by an audio frequency vacuum tube amplifier 10 and supplied to the signal reproducing or utilization circuits which may be located at a remote central office, 2300 cycles being the "black frequency" for radiophoto or facsimile signals and 1500 cycles being the "white frequency."

The converter tube 3, filter 9 and audio frequency amplifier 10 together comprise the converter 17 of my aforementioned copending application.

According to this invention, the output of converter tube 3 is fed through a coupling capacitor 11 to a buffer-amplifier-type coupling vacuum tube 12. Tube 12 serves both to couple the squelch circuit to converter tube 3 and to effectively separate the signal intelligence circuits of the converter, previously described, from the squelch circuit to be hereinafter described. The output of coupling tube 12 is fed to a band pass filter 13 which may, for example, have a pass band 500 cycles wide, centered at 2975 cycles. This pass band must not include any of the 10-kc. center frequency receiver output signal, the 11.9-kc. frequency of oscillator 4, or the converted signal frequencies, which extend from 1500 cycles to 2300 cycles. The output of filter 13 is amplified to a suitable level by audio frequency vacuum tube amplifier 14 and then applied to the primary winding of an output transformer 15.

The secondary winding of transformer 15 feeds the output of amplifier 14 to the anode of a vacuum diode 16, the circuit being completed by grounding one end of such winding, connecting the opposite end thereof to the anode of diode 16, and connecting a cathode load resistor 17 from the cathode 18 of diode 16 to ground. Resistor 17 is bypassed by capacitor 19. A potentiometer 20 having a movable tap 21 thereon, is connected between the positive side of a regulated source of unidirectional potential and the negative side thereof or ground, in order to supply a positive bias (relative to ground) to cathode 18. A capacitor 22 is connected between tap 21 and ground, while this movable tap is connected through resistor 23 to cathode 18.

The voltage across diode cathode resistor 17 is applied through capacitor 24 and resistor 25 to control grid 26 of amplifier vacuum tube 27. Tube 27 is connected substantially conventionally as an amplifier, having the usual cathode resistor-condenser unit and grid leak resistor, etc.

Alternating voltages having a frequency such as to be passed by filter 13 (that is, between 2725 and 3225 cycles, in the example given) appear in the secondary of transformer 15. These voltages, if of large enough amplitude to overcome the bias on diode 16, are rectified in half-wave fashion by this diode, producing pulses of direct current across resistor 17. These direct current pulses appearing across resistor 17 are amplified substantially without distortion by tube 27 and appear in the anode circuit of such tube.

The anode of tube 27 is connected through a capacitor 28 and a full-wave-type charging vacuum diode 29 to capacitor 30 which is shunted by resistor 31. Pulses appearing across resistor 17 are amplified by tube 27 and are utilized to charge capacitor 30 negatively with respect to ground, to which the lower plate of said capacitor is connected. Resistor 31 across capacitor 30 provides the desired time constant for the discharge of said capacitor.

The upper plate of capacitor 30 is connected to the control grid 32 of amplifying vacuum tube 33 in the anode circuit of which is the winding 34 of a relay 35 having two armatures 36 and 37 each cooperating with a make contact, the armatures being spaced away from their make contacts in the illustrated deenergized position of the relay. Relay 35 may be thought of as being of the double-pole, single-throw type. The armatures are connected to opposite sides of a suitable alternating current source indicated at 38. For example, this source may be the usual 110-volt power line. The two make contacts of relay 35 are connected to separate leads 39 and 40 which together constitute a circuit for energization of the receiver AFC motor. The AFC motor control system may be, for example, of the type described and claimed in my copending application, Ser. No. 119,971, filed October 6, 1949, now Patent No. 2,667,579, dated January 26, 1954. The two leads 39 and 40 may take the place of the source 53 in Fig. 2 of application Ser. No. 119,971. This AFC motor control system acts on the local or heterodyning oscillator of the receiver to maintain it at a predetermined center frequency.

More particularly, the leads 39 and 40 (connected to the power source 38 when the contacts of relay 35 are closed) are connected directly to the terminals for one phase of a two-phase AFC motor 41 and are also connected through an AFC motor control relay circuit 42 to the terminals for the other phase of the two-phase motor 41. The relay circuit 42 may be, for example, of the type disclosed and claimed in my aforesaid copending application, Serial No. 119,971. The input to circuit 42 may be derived from the audio tone output of audio frequency amplifier 10, as in my said application. The motor 41 is mechanically coupled to the frequency-determining element of a local heterodyning oscillator in one of the converters in receiver 1, so as to control the frequency of such oscillator. The circuit 42 is responsive to the frequency of the output of amplifier 10, and operates its relays to couple leads 39 and 40 and power source 38 to motor 41 in such a way as to maintain the frequency of the heterodyning oscillator controlled by said motor at a substantially fixed predetermined value. The AFC circuit arrangement including motor 41 and circuit 42 operates in the above-described manner during normal operation of the receiver 1, that is, when an FM radiophoto signal is present in such receiver.

Since the receiver 1 is responsive to carrier-frequency-shifted signals, which are in effect frequency modulated signals, and since such receiver, like a more or less conventional FM receiver, includes limiting stages, the receiver 1 acts like a conventional receiver in one important respect—namely, in the absence of signal therein, a high level of noise is produced by the receiver, since in this case the automatic gain control (AGC) of the receiver permits the gain thereof to increase; in the presence of signal in the receiver, the noise level decreases very substantially, due to the action of the limiting stages and to that of the AGC circuit. Thus, when an FM radiophoto signal is present in the receiver, receiver 1 has very low or almost zero noise output, but when such signal is absent there is a substantial noise output from receiver 1.

The frequency divider in receiver 1, which immediately precedes converter tube 3, is of the binary type (a type whose output is rich in harmonics), and this divider is energized by the random receiver noise at its input, in the absence of a signal in receiver 1. This random noise and harmonics thereof, appear at the anode 6 of tube 3, along with sum and difference frequencies arising from beating with energy from the oscillator 4, as well as the 11.9-kc. oscillator frequency. The result is that the noise frequencies appearing at anode 6, in the absence of signal in the receiver, extend from some very low frequency up to perhaps 25,000 cycles. Under these conditions, there is a substantial amount of energy in the frequency band of 2725–3225 cycles, the band passed by filter 13.

Now let us assume that an FM radiophoto signal is absent in receiver 1. Under these conditions, as previously discussed, the output of converter tube 3 contains only the 11.9-kc. oscillator and noise components, there being a substantial amount of energy in the frequency band of 2725–3225 cycles. The noise frequencies in this band pass through filter 13 with appreciable amplitude, sufficient to overcome the bias on diode 16, resulting in the production of unidirectional pulses across resistor 17. These pulses are amplified by tube 27 and are utilized to charge capacitor 30 negatively with respect to ground. This negative voltage on capacitor 30 is applied to grid 32 of tube 33, biasing this tube to cutoff and releasing or deenergizing relay 35 so that it is in the position illustrated. Then, the energization circuit 39, 40 for the AFC tuning motor in the receiver is not connected to the source 38, so that the motor circuit is open and the tuning motor rendered inoperative. Under these conditions (in response to the absence of a signal in the receiver) the receiver AFC circuit is squelched or rendered inoperative.

Now assume the other of the two possible conditions of operation—namely, that an FM radiophoto signal is present in the receiver 1. Now, there are present in the anode circuit of tube 3 only various signal and oscillator frequencies and no appreciable amplitude of noise frequencies, due to the quieting effect of the carrier on receiver 1. The frequencies present at anode 6 do not pass through the band pass filter 13 with any appreciable amplitude, since they are all outside of the pass band of this filter. The diode 16 is biased because the receiver circuit is not absolutely noise-free in the presence of signal. Tap 21 may be used to adjust the bias on cathode 18 of diode 16 so that any small amounts of noise or signal modulation products which might appear in the output of filter 13 when signal is present will not provide false operation of the squelch circuit. Therefore, when a signal is present in receiver 1, there will be no energy in the output of filter 13 or, if there is any energy in such output it will be of insufficient amplitude to overcome the bias on diode 16. No pulses will appear across resistor 17, so that capacitor 30 is no longer charged negatively through diode 29. The negative charge on 30 leaks off through shunt resistor 31, removing the negative bias from tube 33. Tube 33, having no bias on its grid 32, then conducts or draws anode current through relay winding 34, energizing said relay to close its contacts. This connects the power source 38 to the energization circuit 39, 40 for the receiver AFC tuning motor. Thus, the receiver AFC tuning motor is rendered operative in response to the presence of an FM radiophoto signal in receiver 1, and AFC action can now take place in the normal manner.

What I claim is:

1. In a receiver having a local heterodyning oscillator, apparatus for preventing frequency drift of the receiver in the absence of incoming signals, comprising: an automatic frequency control circuit normally operating to maintain the frequency of said oscillator at a substantially fixed predetermined value, frequency-selective means coupled to said receiver for passing noise frequencies appearing in said receiver and for attenuating signal frequencies in such receiver, and means responsive to noise frequencies passed by said selective means for deenergizing said frequency control circuit, thereby rendering the same inoperative to effect any changes in the frequency of said oscillator.

2. In a receiver having a local heterodyning oscillator, apparatus for preventing frequency drift of the receiver in the absence of incoming signals, comprising: an automatic frequency control circuit normally operating to maintain the frequency of said oscillator at a substantially fixed predetermined value, frequency-selective means coupled to said receiver for passing noise frequencies appearing in said receiver and for attenuating signal frequencies in such receiver, rectifying means coupled to the output of said selective means for deriving therefrom unidirectional pulses, means for utilizing said pulses to charge a capacitor, and means responsive to a charge on said capacitor for deenergizing said frequency control circuit.

3. In a radio frequency carrier shift radiophoto receiver having a local heterodyning oscillator, apparatus for preventing frequency drift of the receiver in the absence of incoming signals, comprising: an automatic frequency control circuit normally operating to maintain the frequency of said oscillator at a substantially fixed predetermined value, frequency-selective means coupled to said receiver for passing noise frequencies appearing in said receiver and for attenuating signal frequencies in such receiver, rectifying means coupled to the output of said selective means for deriving therefrom unidirectional pulses, means for biasing said rectifying means so that only output of said selective means above a predetermined amplitude is used for the derivation of unidirectional pulses, means for utilizing said pulses to charge a capacitor, and means responsive to a charge on said capacitor for deenergizing said frequency control circuit.

4. In a radio frequency carrier shift radiophoto receiver having a local heterodyning oscillator, apparatus for preventing frequency drift of the receiver in the absence of incoming signals, comprising: an automatic frequency control circuit normally operating to maintain the frequency of said oscillator at a substantially fixed predetermined value, a bandpass filter coupled to said receiver for passing a band of noise frequencies which appear in said receiver in the absence of a signal therein and for attenuating the band of signal frequencies in such receiver, rectifying means coupled to the output of said filter for deriving therefrom unidirectional pulses, means for biasing said rectifying means so that only output of said filter above a predetermined amplitude is used for the derivation of unidirectional pulses, means for utilizing said pulses to charge a capacitor, and means responsive to a charge on said capacitor for deenergizing said frequency control circuit.

References Cited in the file of this patent

UNITED STATES PATENTS

| Number | Name | Date |
|---|---|---|
| 2,123,716 | Crosby | July 12, 1938 |
| 2,398,793 | Magnuski | Apr. 23, 1946 |
| 2,409,139 | Magnuski | Oct. 8, 1946 |
| 2,420,518 | Brown | May 13, 1947 |
| 2,453,988 | Guanella | Nov. 16, 1948 |
| 2,501,883 | Weaver | Mar. 28, 1950 |
| 2,507,735 | Peterson | May 16, 1950 |
| 2,513,786 | Crosby | July 4, 1950 |
| 2,533,543 | Young | Dec. 12, 1950 |
| 2,644,035 | Trevor | June 30, 1953 |